(No Model.)
H. WAGNER.
HARROW.
No. 534,306. Patented Feb. 19, 1895.
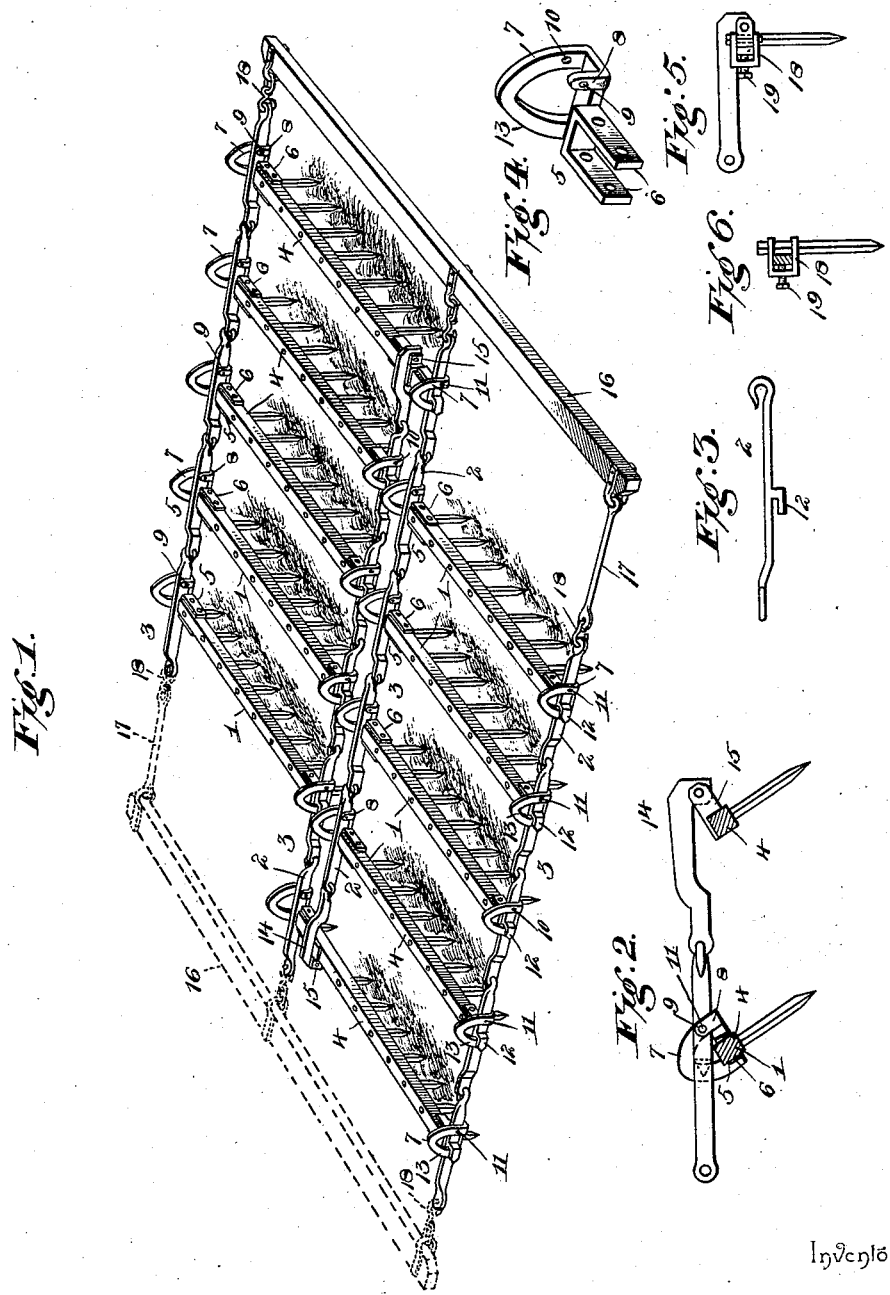
Witnesses
Inventor
Henry Wagner,
By his Attorneys.
THE NORRIS PETERS CO., PHOTO-LITHO., WASHINGTON, D. C.

UNITED STATES PATENT OFFICE.

HENRY WAGNER, OF CAMBRIA, WISCONSIN.

HARROW.

SPECIFICATION forming part of Letters Patent No. 534,306, dated February 19, 1895.

Application filed July 11, 1893. Serial No. 480,163. (No model.)

*To all whom it may concern:*

Be it known that I, HENRY WAGNER, a citizen of the United States, residing at Cambria, county of Columbia, State of Wisconsin, have invented a certain new and useful Improvement in Harrows; and I declare the following to be a full, clear, and exact description of the invention, such as will enable others skilled in the art to which it pertains to make and use the same, reference being had to the accompanying drawings, which form a part of this specification.

My invention relates to harrows, and has for its object to provide a simple, inexpensive, and efficient construction capable of reversal whereby the teeth may be caused to cut into the soil to act as a cultivator or may be caused to glide over the surface thereof to break clods and loosen the soil.

Further objects and advantages of the invention will appear in the following description and the novel features thereof will be particularly pointed out in the appended claims.

In the drawings: Figure 1 is a perspective view of a harrow embodying my invention. Fig. 2 is a detail sectional view of a portion of the harrow, showing the disposition of the parts when the direction of draft is reversed. Fig. 3 is a detail view of one of the links. Fig. 4 is a detail view, in perspective, of one of the guides. Fig. 5 is a detail view of the joint between one of the terminal links and a tooth bar, when such tooth bar is constructed of metal. Fig. 6 is a detail view showing the means for securing a tooth to a tooth-bar of metal.

Similar numerals of reference indicate corresponding parts in all the figures of the drawings.

In the construction illustrated in the drawings I have shown two longitudinal series of parallel transverse tooth-bars, connected at their extremities by the longitudinally disposed side-bars. The tooth-bars 1 are pivotally connected at their extremities to intermediate points of the links 2 composing the side-bars 3, and the inner or adjacent side-bars are connected near their extremities, to hold the two series of tooth-bars in their proper relative positions, by the terminal bars 4, one for each series, which extend from the outer side-bar of each member of the harrow to and beyond the inner side-bar of the same member and are connected to the inner side-bar of the other member. These terminal tooth bars preferably carry teeth similar to those with which the other bars are provided.

The transverse bars comprising the members of the harrow are provided at their extremities with guides 5, consisting of parallel-sided clips 6, to embrace the ends of the bars, arches 7, and ears 8 which are spaced from the planes of the arches. The side of each arch which is opposite to the ear 8 of the same guide is concentric with a perforation 9 in said ear and a corresponding aligned perforation 10 in the adjacent side of the arch, and the links 2, comprising the side-bars are pivotally connected to the guides by means of pivot-pins 11 engaging said aligned perforations. Said links also carry stop-lugs 12 which engage the concentric sides or segmental guide-bars 13 of the arches 7, and the contact of these lugs with the portions of the arches contiguous to the ends of these segmental guide-bars limits the swinging movement of the transverse bars. Inasmuch as the terminal transverse bar at one end of each member is extended to connect with the inner side-bar of the other member, as above described, the terminal link 14 of the inner-side-bar of the member to which said extended bar belongs differs slightly in construction from the other links of the side-bar, in that it is carried over and pivoted between ears 15 on the far side of the said extended or terminal transverse bar, as clearly shown in Fig. 2 of the drawings.

The draft-bar 16 is connected to the extremities of the side-bars by means of draft-chains 17 having terminal hooks 18 which are adapted to be engaged with the ends of the side-bars at either end of the harrow. When the draft-bar is arranged at the end of the harrow as shown in full lines in Fig. 1, the forward motion of the device does not affect the positions of the tooth-bars. They remain in such position that the teeth are upright, as shown in Fig. 1, by reason of the guiding-lugs or stop-lugs 12 bearing upon the stops or portions of the guides adjacent to the lower ends of the segmental sides of the arches. When the draft-bar is arranged at the opposite end of the machine, as shown in dotted lines in Fig. 1, the forward motion of the harrow causes the teeth to assume the inclined position indicated in Fig. 2, in which the stop-lugs 12 are in contact with the stops or portions of the guides at the upper ends of the segmental sides of the arches.

In Figs. 5 and 6 I have shown the means for securing the parts of the harrow together when the tooth-bars are constructed of metal instead of wood. In this case the teeth are secured to the tooth-bars by means of the clips 18 and set-screws 19, the upper ends of the teeth being engaged with perforations in the extremities of the parallel sides of the clips.

It will be understood that in practice, various changes in the form, proportion, and minor details of construction may be resorted to without departing from the spirit or sacrificing any of the advantages of my invention.

Having thus described my invention, I claim—

1. In a harrow, the combination of a plurality of parallel members, comprising inner and outer side-bars, interposed transverse tooth-bars pivotally connected at their extremities to the side-bars, segmental guiding-bars carried by the tooth-bars concentric with the pivotal points of connection of said bars, stop-lugs carried by the side-bars and engaging said segmental guiding-bars, and draft apparatus and means for securing the same to either end of the side-bars, substantially as specified.

2. In a harrow, the combination of a plurality of members, each comprising an inner and an outer side bar constructed of loosely connected sections or links, transverse tooth-bars pivotally connected at their extremities to said links, and means for limiting the swinging movement of the tooth-bars; terminal transverse bars connecting the outer side-bars of each member with the inner side-bars of the other member, and pivotally connected thereto and to the inner side bars of their respective members, draft apparatus and means for attaching the same to either end of the side-bars, substantially as specified.

In testimony whereof I sign this specification in the presence of two witnesses.

HENRY WAGNER.

Witnesses:
A. SCHLIESMANN,
WILLIAM MARTIN.